(12) United States Patent
Lefevre et al.

(10) Patent No.: US 11,671,005 B2
(45) Date of Patent: Jun. 6, 2023

(54) DEAD TIME CONTROL IN A SWITCHING CELL

(71) Applicant: Commissariat à l'Énergie Atomique et aux Énergies Alternatives, Paris (FR)

(72) Inventors: Guillaume Lefevre, Grenoble (FR); Guillaume Piquet-Boisson, Grenoble (FR)

(73) Assignee: Commissariat à l'Énergie Atomique et aux Énergies Alternatives, Paris (FR)

(*) Notice: Subject to any disclaimer, the term of this patent is extended or adjusted under 35 U.S.C. 154(b) by 66 days.

(21) Appl. No.: 16/950,707

(22) Filed: Nov. 17, 2020

(65) Prior Publication Data
US 2021/0159780 A1    May 27, 2021

(30) Foreign Application Priority Data
Nov. 25, 2019  (FR) ...................... 1913169

(51) Int. Cl.
*H02M 1/38* (2007.01)
*H02M 3/158* (2006.01)
*H02M 1/00* (2006.01)
*H02M 1/08* (2006.01)

(52) U.S. Cl.
CPC .............. *H02M 1/38* (2013.01); *H02M 1/083* (2013.01); *H02M 3/158* (2013.01); *H02M 1/0009* (2021.05)

(58) Field of Classification Search
CPC ....... H02M 1/38; H02M 1/083; H02M 1/0009
See application file for complete search history.

(56) References Cited

U.S. PATENT DOCUMENTS

| | | | | |
|---|---|---|---|---|
| 4,214,213 A * | 7/1980 | Ferrie | ................... | H04B 7/082 327/63 |
| 4,400,655 A * | 8/1983 | Curtiss | .................. | H02J 3/1892 318/729 |
| 6,294,954 B1 * | 9/2001 | Melanson | ...... | H03K 19/018585 330/10 |
| 7,557,545 B2 * | 7/2009 | Naka | ..................... | H02M 3/157 323/283 |
| 2008/0252277 A1* | 10/2008 | Sase | ...................... | H02M 3/157 323/283 |
| 2011/0221414 A1* | 9/2011 | Pigott | ................. | H02M 3/1588 323/283 |
| 2014/0132236 A1* | 5/2014 | Darmawaskita | ...... | H02M 3/156 323/283 |

(Continued)

FOREIGN PATENT DOCUMENTS

WO    WO 01/22585 A1    3/2001

OTHER PUBLICATIONS

Preliminary Search Report for French Application No. 1913169, dated Jul. 30, 2020.

(Continued)

*Primary Examiner* — Gustavo A Rosario-Benitez
(74) *Attorney, Agent, or Firm* — Wolf, Greenfield & Sacks, P.C.

(57) ABSTRACT

A method of controlling first and second switches of a switching cell, including measuring a current flowing through the first switch when the first switch is controlled to the off state, and setting a switching dead time according to the measurement.

10 Claims, 7 Drawing Sheets

(56) References Cited

U.S. PATENT DOCUMENTS

| | | | | |
|---|---|---|---|---|
| 2015/0256074 A1* | 9/2015 | Biondi | .................... | H02M 1/38 |
| | | | | 323/271 |
| 2016/0126946 A1* | 5/2016 | Joos | .................... | H03K 17/165 |
| | | | | 327/109 |
| 2019/0103812 A1* | 4/2019 | Chang | .................... | H02M 3/158 |
| 2021/0067046 A1* | 3/2021 | Adragna | ................. | H02M 1/08 |
| 2021/0194378 A1* | 6/2021 | Tian | ................. | H02M 3/33592 |

OTHER PUBLICATIONS

Abu-Qahouq et al., Maximum efficiency point tracking (MEPT) method and dead time control. 2004 IEEE 35th Annual Power Electronics Specialists Conference (PESC). Jun. 20, 2004;5:3700-6.
Hong et al., Optimum efficiency-tracking gate driver using adaptive deadtime control for single chip DC-DC converter. 2006 37th IEEE Power Electronics Specialists Conference (PESC) Jun. 18, 2006:1-5.
Lee et al., Robust and efficient synchronous buck converter with near-optimal dead-time control. 2011 IEEE International Solid-State Circuits Conference (ISSCC). Feb. 20, 2011:392-4.

* cited by examiner

DEAD TIME CONTROL IN A SWITCHING CELL

CROSS-REFERENCE TO RELATED APPLICATIONS

This application claims priority to French patent application number 1913169, filed Nov. 25, 2020, the contents of which is incorporated herein by reference in its entirety.

TECHNICAL BACKGROUND

The present disclosure generally relates to electronic devices and, more specifically, to switched-mode converters.

PRIOR ART

Switched-mode converters are used to deliver a voltage and/or a current from a power supply having voltage/current values different from the voltage/current values to be delivered. The power supply may be a DC voltage/current source, such as a battery or a photovoltaic sensor, or an AC source, such as an alternator or a power distribution system. The voltage and/or the current may be delivered to a load in DC form, for example, to a battery to be charged, or in AC form, for example to a motor or to a power distribution system.

Switched-mod converters typically comprise one or a plurality of switching cells. Each switching cell comprises two switches, controlled (for example, transistors) or non-controlled (for example, of diode type), electrically coupled in series. The switches may alternately switch from the conductive (on) state to the non-conductive (off) state at a frequency called switching frequency. The switches are controlled in opposition, that is, so that when one of the switches is on, the other one is off.

SUMMARY

There is a need to improve the efficiency of known switched-mode converters.

There is a need, in particular for known converters receiving and/or delivering AC voltages/currents, to decrease the level of harmonics caused by the converters in the power supply and/or in the load.

There is a need to simplify known methods and devices for controlling the switches of switching cells.

An embodiment overcomes all or part of the disadvantages of known methods of controlling switches of switching cells.

An embodiment overcomes all or part of the disadvantages of known devices for controlling switches of switching cells.

An embodiment overcomes all or part of the disadvantages of known converters, in particular of switched-mode converters.

An embodiment provides a switching cell having a higher conversion efficiency than known switching cells.

An embodiment provides a method of controlling first and second switches of a switching cell, comprising measuring a current flowing through the first switch when the first switch is controlled to the off state, and setting a switching dead time according to the measurement.

According to an embodiment, the measurement is performed when the second switch is controlled to the on state.

According to an embodiment, the first switch comprises a diode, coupling terminals of the first switch and oriented to conduct a current supplied or received by the switching cell when the first and second switches are simultaneously in the off state, the diode preferably being a body diode of the switch and/or a PN junction diode.

According to an embodiment, the setting comprises determining a value representative of an integral of a value resulting from the measurement during an integration period.

According to an embodiment, a duration of the integration period is predefined and/or in the range from 0.1% to 50% of a switching cycle time, and/or greater than or equal to a duration between two successive zero crossings of the current flowing through the first switch.

According to an embodiment, the integration period starts at a time when said value resulting from the measurement is representative of a zero value of the current flowing through the first switch.

According to an embodiment, said setting comprises determining a switching dead time for which the value representative of the integral exhibits an extremum.

According to an embodiment, the method further comprises another measurement of another current flowing through the second switch when the second switch is controlled to the off state, and the setting of said switching dead time and/or of another switching dead time according to said measurement and/or to said other measurement.

An embodiment provides a device configured to implement a method such as defined hereabove.

An embodiment provides a switching cell comprising a device such as defined hereabove and the first and second switches.

According to an embodiment, the cell comprises a sensor configured to measure the current flowing through the first switch.

According to an embodiment, said sensor comprises a magnetic-type sensor, preferably a transformer.

According to an embodiment, the cell comprises a third switch coupling output terminals of said sensor and, preferably, controlled by a same control signal as the first switch.

According to an embodiment, said device comprises:
- a comparator circuit and a link between an input of the comparator circuit and said sensor, another input of the comparator circuit being coupled to a first node of application of a fixed potential;
- a monostable circuit having a trigger input coupled to an output of the comparator circuit;
- a multiplexer controlled by the monostable circuit and having an input coupled to said sensor; and
- an integrator circuit having an input coupled to an output of the multiplexer, the integrator circuit preferably comprising a resistor and a capacitor in series between said input of the integrator circuit and the first node or another node of application of a fixed potential.

According to an embodiment:
- said link comprises another multiplexer having an input coupled to said sensor and an output coupled to said input of the comparator circuit, said other multiplexer having another input coupled to the first node or to a second node of application of a fixed potential; and
- another monostable circuit has a trigger input coupled to the output of said monostable circuit and controls said other multiplexer.

An embodiment provides a switched-mode converter comprising at least one device such as defined hereabove or at least one cell such as defined hereabove.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the converters to which the described embodiments apply are not detailed, the described embodiments being compatible with usual converters comprising switch cells with two controlled switches. Further, driver circuits, configured to apply control signals to switches of a switching cell, are not detailed, the described embodiments being compatible with such usual circuits.

Unless specified otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
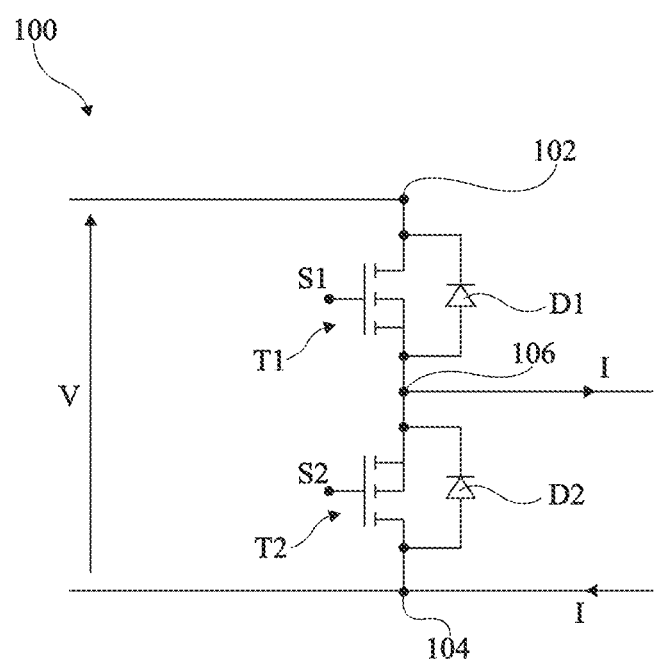
FIG. 1 schematically shows a switching cell of the type to which the described embodiments apply.

FIG. 1 schematically shows a switching cell 100 of the type to which the described embodiments apply.

Switching cell 100 comprises two switches T1 and T2. Switches T1 and T2 may be any type of controlled switch capable of forming a switching cell. Preferably, switches T1 and T2 are N-channel MOS-type field effect transistors. As a variant, the MOS transistors are P-channel transistors. In other variants, the switches are of bipolar transistor type or of insulated gate bipolar transistor type, IGBT. Each switch may also comprise a plurality of elementary switches electrically in parallel. Preferably, the elementary switches are similar or identical. Identical here means identical to within manufacturing tolerances. The elementary switches may be MOS-type transistors (as a variant, bipolar-type transistors). The transistors of a same switch T1, T2 then have their source terminals (as a variant, their emitter terminals) connected to one another and their drain terminals (as a variant, their collector terminals) connected to one another. There may be any number of elementary switches.

Switches T1 and T2 are electrically in series between terminals, or nodes, 102 and 104. More particularly, a node 106 couples, preferably connects, switches T1 and t2 to each other. Switch T1 has conduction terminals coupled, preferably connected, respectively to nodes 102 and 106, and switch T2 has conduction terminals coupled, preferably connected, respectively to nodes 106 and 104. Conduction terminal means the terminals of the switch between which an electric connection is established when the switch is in the on state, for example, the drain/source terminals or, as a variant, the collector/emitter terminals. The on or off state of each switch T1 and T2 is controlled by a control signal, respectively S1 and S2. Signals S1 and S2 are applied to respective control terminals of the switches, for example, to a gate terminal or, as a variant, a base terminal. Signals S1 and S2 may be applied in differential fashion between the control terminal and a conduction terminal, for example, between the control terminal and a source terminal or, as a variant, between the control terminal and the emitter terminal. Signals S1 and S2 may be set to levels compatible with the voltage levels of the switches.

Switch T2 preferably comprises a diode D2 coupling the conduction terminals of switch T2. In the shown example, diode D2 has its cathode coupled, preferably connected, to node 106 and its anode coupled, preferably connected, to node 104. More preferably, switch T1 also comprises a diode D1 coupling the conduction terminals of switch T1. In the shown example, diode D1 has its cathode coupled, preferably connected, to node 102 and its anode coupled, preferably connected, to node 106. Preferably, diodes D1 and D2 are so-called body diodes, more particularly, each diode D1, D2 is defined by a PN junction between doped semiconductor regions of the respective transistor T1, T2. The expression PN junction means an interface between two doped semiconductor regions of two opposite conductivity types N and P. The two regions may be in contact directly or via a body region, that is, a non-doped or non-intentionally doped region.

Each diode D1, D2 may be made of a single diode, or of a plurality of elementary diodes in parallel, preferably similar or identical. More particularly, the elementary diodes of each diode D1, D2 have cathode terminals connected to one another, and anode terminals connected to one another. The elementary diodes are preferably the body diodes of the elementary switches connected in parallel. Thus, there may be any number of elementary diodes.

In the shown example, switching cell 100 receives a positive voltage V between terminals 102 and 104 of the series association of switches T1 and T2. In this example, switching cell 100 supplies a current I coming out of connection node 106 between switches T1 and T2. Still in this example, current I flows back into node 104. This example is not limiting, since the voltage may be a negative voltage and/or current I may also be a current flowing into connection node 106 and, for example, coming out of node 104. Further, the switching cell may comprise more than two switches in series, controlled according to a repeated cycle at the switching frequency, the switches being in each cycle, in turns, alone in the on state. The switching frequency may be fixed, that is, constant, or variable.

Switching cell 100 is typically contained in a converter, preferably a switched-mode converter. The converter may comprise switching cell 100 only. The converter may also further comprise other switching cells, preferably similar or identical to switching cell 100. The switching cells then are for example in parallel between terminals 102 and 104, these terminals being common to the switching cells. As an example, the switching cells in parallel form an H bridge or, for example, a three-phase bridge. Each switching cell then forms a branch of the H bridge or, for example, of the three-phase bridge.

The converter is not described in detail herein, the described embodiments being compatible with usual switched-mode converters comprising one or a plurality of switching cells with controlled switches. Voltage V may be an input or output voltage of the converter. Voltage V may also be that across a capacitive element, not shown, internal to the converter. Current I may be an input or output current of the converter. Current I may also be a current flowing through an inductive element, not shown, internal to the converter.

Figure 2:
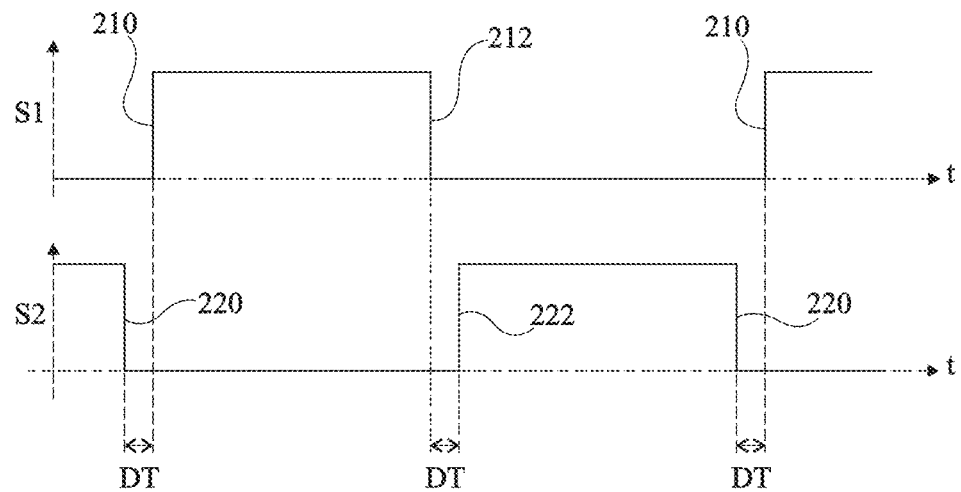
FIG. 2 shows, in the form of simplified timing diagrams, examples of signals for controlling the cell of FIG. 1.

FIG. 2 shows, in the form of simplified timing diagrams, examples of signals S1 and S2 for controlling the cell of FIG. 1, shown as a function of time t.

Each of signals S1 and S2 has a low level and a high level. The low and high levels of signal S1 control the respective off and on states of switch T1. In other words, when signal S1 is at its low level, respectively at its high level, switch T1 is controlled to the off, respectively on, state. Similarly, when signal S2 is at its low level, respectively at its high level, switch T2 is controlled to the off, respectively on, state. For each of the signals, the low and high levels may be exchanged, for example if switches T1 and T2 are P-channel MOS transistors or normally-on gallium nitride, GaN, switches.

Each of signals S1 and S2 is a repeated square pulse signal at the switching frequency, that is, each signal exhibits a succession of cycles and alternately takes its low and high levels in each cycle. More particularly, signal S1 comprises rising edges 210 between the low and high levels of signal S1, and falling edges 212 between the high and low levels of signal S1. Signal S2 comprises falling edges 220 between the high and low levels of signal S2, and rising edges 222 between the low and high levels of signal S2. In the shown example, the edges are abrupt, that is, the duration of the edges is shorter than approximately 1% of the duration separating the successive rising edges. As a variant, the edges are not abrupt. For example, each edge comprises passages through one or a plurality of intermediate levels located between the low and high levels. The concerned signal is maintained at each intermediate level for part of the duration of the edge. In the present description, call in this case time of an edge the time at which the concerned signal crosses a predefined value, for example an intermediate level corresponding to a voltage threshold of the switches.

A switching time is defined by the time separating successive rising edges or the successive falling edges of one of the signals, for example, signal S1. The time separating two successive edges is constant for a constant switching frequency and variable for a variable switching frequency.

A switching duty cycle is defined by the ratio of the duration of the high level of one of the signals taken as a reference, for example, signal S1, to the duration of a switching cycle. The duty cycle varies in operation within a range from 0 to 1 according to current/voltage values in the converter. In the shown example, the duty cycle is in the order of 0.5. The setting of the duty cycle according to the current/voltage values of the converter is not described in detail herein, the described embodiments being compatible with usual methods of setting the duty cycle of a switching cell of a converter.

As previously mentioned, when one of signals S1 and S2 is at its high level, the other signal is at its low level. More particularly, when signal S1 is at its high level after a rising edge 210, signal S2 is at its low level after a falling edge 220 preceding rising edge 210. A dead time having a duration equal to a value DT extends between each falling edge 220 and the next rising edge 210. A dead time is defined by a period during which the two control signals S1 and S2 simultaneously control the off state of transistors T1 and T2. The dead time is repeated for each switching, that is, for each passage from the on state of one of the switches to the on state of the other one of the switches. Dead time value DT corresponds to the duration of this repeated period. Similarly, when signal S2 is at its high level after a rising edge 222, signal S1 is at its low level after a falling edge 212 preceding rising edge 222. A dead time, for example, having a duration equal to a value DT, extends between each falling edge 212 and the next rising edge 222.

After each falling edge 212, 220, the switch T1, T2 controlled by the concerned signal S1, S2 is controlled to the off state, but this switch switches to the fully off state after a delay following the edge. Such a delay mainly depends on the switch and on a circuit which applies signal S1, S2 to the control terminal of the switch. Thus, the dead times enable to avoid for the two switches T1 and T2 to be momentarily simultaneously on.

Figure 3:
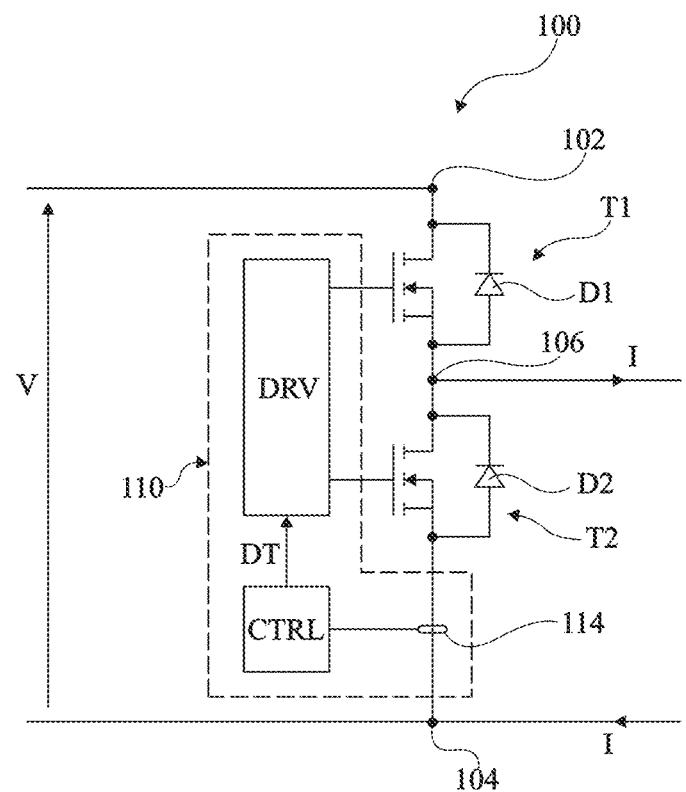
FIG. 3 schematically shows an embodiment of a switching cell comprising a control device.

FIG. 3 schematically shows an embodiment of a switching cell 100. Switching cell 100 corresponds to that of FIG. 1 having a device 110 for controlling the two switches T1, T2 of switching cell 100 added thereto.

The control signals S1 and S2 of the respective switches T1 and T2 are supplied by control device 110. Control device 110 comprises a circuit DRV, called driver circuit. Circuit DRV is configured to apply signals S1 and S2 to the control terminals of respective switches T1 and T2.

According to the present embodiment, control device 110 comprises a current sensor 114 configured to measure a current flowing through switch T2. Thus, current sensor 114 is in series with switch T2 between nodes 104 and 106. In the shown example, the sensor couples node 104 to switch T2. In another example, not shown, sensor 114 couples switch T2 to node 106. In operation, sensor 114 measures the current through switch T2 and outputs a measurement value, in other words, a value resulting from the measurement. In other embodiments, in particular if current I flows into node 106, current sensor 114 may be configured to measure a current flowing through switch T1. These other embodiments correspond, for example, to the present embodiment, where the roles of switches T1 and T2 are inverted.

Control device 110 further comprises a control circuit CTRL coupled, preferably connected, to sensor 114. In operation, control circuit CTRL determines a switching dead time value DT and delivers this value to circuit DRV.

The switching dead time is set in operation. Such a setting of the dead time is performed according to a measurement, supplied by sensor 114, of the current flowing through switch T2 when signal S2 controls the off state, that is, controls the non-conductive state, of switch T2. Dead time setting means the adjustment of dead time value DT, that is, the setting comprises varying dead time value DT, preferably from an initial value, to adjust the operation of the switching cell. The initial value may be any usual dead time value and/or preferably a value obtained during tests to adjust the switching cell. Adjustment tests are not detailed herein, the described embodiment being compatible with the adjustment tests of a switching cell currently performed to obtain a dead time value. As detailed hereafter, the fact of setting the dead time according to the current flowing through switch T2 controlled to the off state enables, in particular, to improve the efficiency of the switching cell, and to simplify its operation.

As a variant, the duration separating each falling edge 212 (FIG. 2) from the next rising edge 222 (FIG. 2) has a value different from value DT and defines another dead time value. Such another dead time value may then be adjusted similarly to the described embodiments to adjust dead time value DT from a measurement of the current in switch T2 and/or in switch T1. Thus, the dead time separating each edge 220 (FIG. 2) from the next edge 210 (FIG. 2) and/or the dead time separating each edge 212 (212) from the next edge 222 (FIG. 2) may be set from a measurement of the current in switch T2 and/or in switch T1.

During the dead time, switches T1 and T2 risk being simultaneously in the off state while current I has a non-zero value. In the example shown in FIG. 1, the diode D2 of switch T2 is oriented to conduct the current I supplied by the switching cell when the two switches T1 and T2 are in the off state. Diode D2 is then called a free wheel diode. In the example shown in FIG. 1, diode D1 does not play the role of a free wheel diode.

Preferably, the dead time is set according to the current flowing through the switch which, among switches T1 and T2, plays the role of a free wheel diode. The free wheel diode is diode D2 in the example of FIG. 1. In particular, according to the sign of voltage V, to the orientation of the diodes, and to the direction of current I, the free wheel diode may be diode D1. In another variant, for example, in the presence of an AC current or voltage, diodes D1 and D2 may in turns play the role of a free wheel diode, and a current sensor such as sensor 114 (FIG. 3) may be provided for each switch T1, T2.

Preferably, as illustrated hereafter, the measurement of the current in switch T2 used to set the dead time is performed when switch T1 is controlled to the on state. In other words, the measurement is performed during a period when switch T1 is controlled to the on state, that is, this period extends between a rising edge 210 (FIG. 2) and the following rising edge 212. The term measurement of the current used to set to dead time designates all the measurement values supplied by current sensor 114 except for possible measurement values which might be supplied by the current sensor without being used to set the dead time. More preferably, the current measurement used to set the dead time is performed after the rising edge at a period when switch T1 already allows the flowing of at least a portion of the current I supplied by the converter, and this portion of current I thus does not flow through free wheel diode D2. Thus, the measurement of the current in switch T2 controlled to the off state used to set the dead time is performed outside of the dead time.

Figure 4:
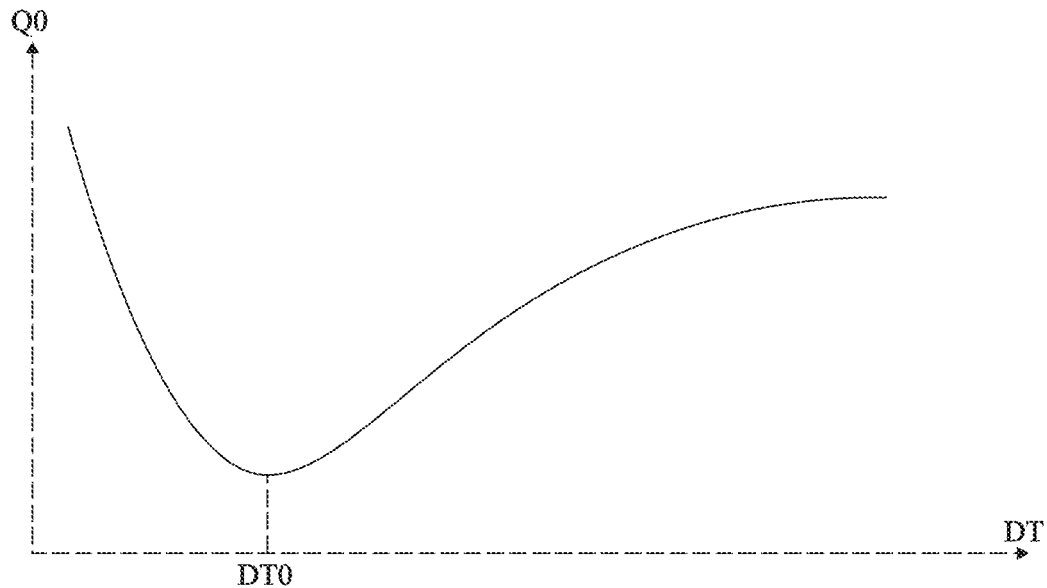
FIG. 4 schematically shows the shape of an integral of a current in a switch of the switching cell of FIG. 3 according to a switching dead time value.

FIG. 4 schematically shows the shape of an integral Q0 of a current in the switch T2 of the switching cell of FIG. 3 according to dead time value DT.

Preferably, the setting of the dead time comprises determining a value representative of integral Q0. Integral Q0 is the integral, during an integration period, of the measurement value supplied by sensor 114 (FIG. 3). The value representative of the integral thus corresponds to an average value during the integration period. Switch T2 is controlled to the off state during the entire integration period and, preferably, switch T1 is controlled to the on state during the entire integration period. Preferably, the duration of the integration period is predefined. As an example, the duration of the integration period is in the range from 0.1% to 50% of the switching cycle time, preferably from 1% to 20% of the switching cycle time. The value representative of integral Q0 is also representative of a charge crossing switch T2 during the integration period.

The inventors have observed that integral Q0 according to dead time value DT typically exhibits a minimum for a dead time value DT0. Preferably, the dead time is then set so that its value is equal to value DT0. Thus, the dead time is set so that integral Q0 is minimum. In other words, the dead time is set so that a value representative of integral Q0, that is, any value which varies monotonously (increasing or decreasing) according to integral Q0, exhibits an extremum. More particularly, the extremum is a minimum in the case where the value representative of Q0 increases monotonously according to Q0 (for example, using a non-inverting inverter), and the extremum is a maximum in the case where the value representative of Q0 decreases monotonously according to Q0 (for example, using an integrator inverter).

For this purpose, as an example, an iterative determination of the limiting value is implemented. The iterative extremum search algorithm is not detailed herein, the described embodiments being compatible with usual iterative extremum search algorithms. Preferably, switches T1 and T2 are selected so that integral Q0 exhibits a single minimum value. However, in particular when switches T1 and T2 are each formed of a plurality of elementary switches, integral Q0 may exhibit a plurality of minimum values. In this case, a usual iterative general extremum search algorithm is preferably used in the presence of a plurality of limiting values.

Figure 5:
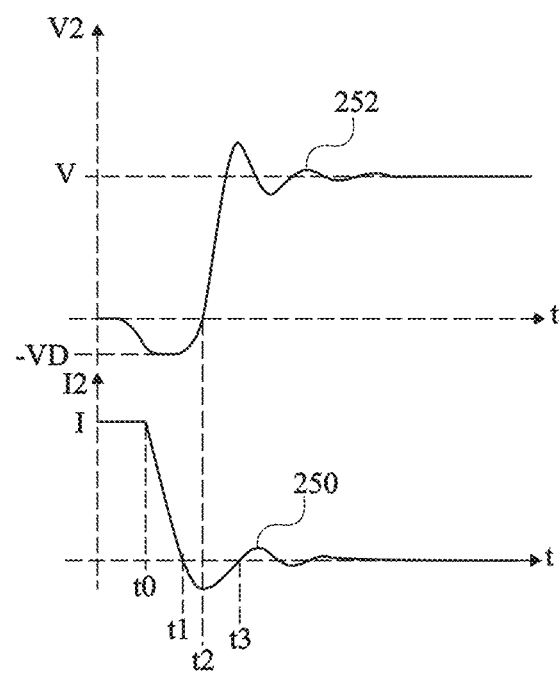
FIG. 5 shows, in the form of simplified timing diagrams, an example of currents and of voltages in a switch of the switching cell of FIG. 3.
Figure 6:
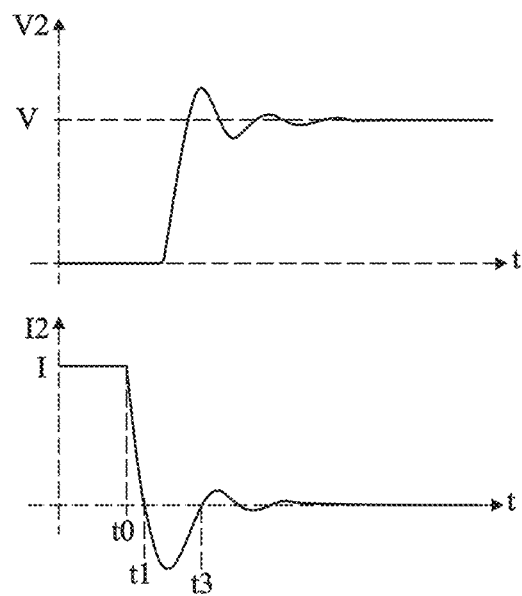
FIG. 6 shows, in the form of simplified timing diagrams, another example of currents and voltages in a switch of the switching cell of FIG. 3.
Figure 7:
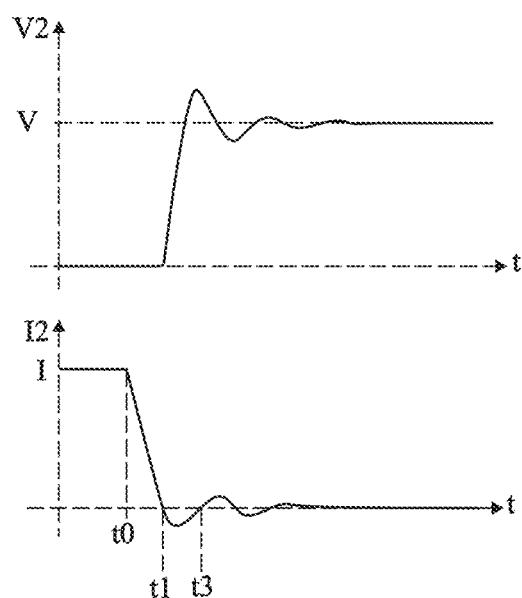
FIG. 7 shows, in the form of simplified timing diagrams, still another example of currents and voltages in a switch of the switching cell of FIG. 3.

FIGS. 5, 6, and 7 show, in the form of simplified timing diagrams, examples of shapes of voltage V2 across switch T2 and of the current I2 flowing through switch T2. More particularly, the examples of FIGS. 5, 6, and 7 correspond to three different dead time values DT. The timing diagrams very schematically show the shapes of voltage V2 and of current I2 according to time t during a switching, before and after a time t0 of the rising edge of signal S1.

In the example of FIG. 5, dead time value DT is relatively high, that is, greater than the value DT0 corresponding to the minimum of integral Q0 of FIG. 4.

Before time t0, switch T1 is off. The current I (FIG. 3) supplied by the switching cell flows through switch T2 towards node 106 (FIG. 3) of connection between switches T1 and T2. From time t0, switch T2 is controlled to the on state. The current I2 in switch T2 then decreases as the current in switch T1 increases. Current I2 takes a zero value at a time t1.

Due to the fact that dead time value DT is relatively high, a portion of current I2 flows through free wheel diode D2 (FIG. 3). This makes the voltage V2 across switch T2 negative. For example, when the dead time value is sufficiently long, voltage V2 comes closer to a threshold value −VD of the PN junction of forward-biased diode D2.

After time t1, current I2 takes a negative value, that is, current I2 flows through switch T2 from switch T1. Current I2 then discharges the capacitor due to the PN junction of diode D2. When, at a time t2, the capacitor is discharged, voltage V2 takes a zero value. Thus, the charge which flows through switch T2 between times t1 and t2 comprises at least one charge QREC linked to the capacitance of the PN junction.

After time t2, voltage V2 reaches, to within voltage drops in switch T1 and in its connections, the value of voltage V across the switching cell, corresponding to the situation where switch T1 is fully conductive. For this purpose, current I2 is negative and delivers a charge QOSS to the semiconductor structure of switch T2, typically to form space charge areas in semiconductor regions of the switch, at last until voltage V2 has approximately, that is, to within the above-mentioned voltage drops, the value of voltage V. Respective damped oscillations 250 and 252 of current I and of voltage V respectively occur around the zero value and around approximately the value of voltage V. The oscillations are linked to the switch capacitance, which contains charge QOSS, and to stray inductances of the switching cell. Thus, current I2 takes a zero value at a time t3 subsequent to time t2, and becomes positive after time t3 before oscillating again.

In the example of FIG. 6, dead time value DT is relatively low, that is, smaller than the dead time value DT0 corresponding to the minimum of integral Q0 of FIG. 4.

After time t0, as in FIG. 5, current I2 in switch T2 decreases as the current in switch T1 increases. Current I2 in switch T2 takes a zero value at a time t1.

Due to the fact that the value of the dead time is relatively small, switch T2 is still conductive when switch T1 turns on. Thus, a current IADD simultaneously flows in switches T1 and T2 (negative current I2). After time t1, a charge QADD thus simultaneously crosses switches T1 and T2. When switch T2 is sufficiently non-conductive, voltage V2 reaches voltage value V across the switching cell similarly to that of FIG. 5, and charge QOSS adds to charge QADD. In particular, current I2 takes a zero value at time t3 and becomes positive after time t3 before oscillating again in damped fashion.

In the example of FIG. 7, the value of dead time DT is close to value DT0 corresponding to the minimum of integral Q0 of FIG. 4.

After time t0, as in FIGS. 5 and 6, the current I2 in switch T2 decreases as the current in switch T1 increases. The current I2 in switch T2 takes a zero value at a time t1.

As compared with the relatively high dead time value of the example of FIG. 5, the dead time value DT close to value DT0 does not give diode D2 time to become fully conductive. The smaller value of integral Q0 may be explained by the fact that the charge QREC supplied to discharge the capacitance of diode D2 is smaller. Due to the fact that diode D2 has not become fully conductive, energy losses due to the flowing of the current in diode D2 and to voltage drop −VD in diode D2 are avoided. Indeed, the voltage drop across switch T2 when the latter is in the on state is smaller than the voltage drop across switch T2 when the current flows through diode D2. This particularly enables to increase the power efficiency of the switching cell, and also the power efficiency of a converter comprising such a switching cell.

Further, as compared with the relatively high dead time value of the example of FIG. 5, the dead time value DT close to value DT0 is smaller, which enables to increase the variation range of the switching duty cycle. This enables the switching cell to operate for duty cycles closer to 0 or to 1 than for relatively high dead time values. Duty cycles close to 0 or to 1 address specific cases of the voltage/current at the converter input/output. This is more particularly advantageous when the switching cell is contained in a converter receiving an AC voltage. In this case, the frequency of the AC voltage is smaller than the switching frequency, so that the AC voltage is substantially constant during a switching cycle. The duty cycle becomes closer to 0 or to 1 when the voltage changes sign between two halfwaves. Increasing the variation range of the duty cycle then enables, for example, to decrease harmonics in the current consumed by the converter, due to AC voltage sign changes between halfwaves. It may also occur that the duty cycle becomes closer to 0 or to 1 when the AC voltage takes, in absolute value, values close to a maximum voltage in the middle of a halfwave. This may occur when the maximum value is close to a voltage across a load, not shown, having current I supplied thereto. Similarly, this enables to decrease the harmonics of a converter delivering an AC voltage.

As compared with the relatively small dead time value of the example of FIG. 6, the dead time value DT close to value DT0 gives switch T2 time to be sufficiently non-conductive to limit or avoid current IADD simultaneously flowing through the two switches T1 and T2. The smaller value of integral Q0 may be explained by the fact that value QADD is thus decreased or zero. Due to the fact that the current IADD simultaneously flowing through the two switches is decreased or avoided, energy losses due to this current are decreased or avoided. This thus particularly enables to increase the power efficiency of the switching cell, and also the power efficiency of a converter comprising such a switching cell.

Further, when the dead time value is relatively small, current IADD flowing at the same time through the two switches T1 and T2 forms a current peak absorbed by the cell at each switching. Such a repeated current peak is a source of harmonics in the absorbed current. Decreasing or avoiding this current enables to decrease or to avoid harmonics in the absorbed current.

Thus, setting the dead time so that its value DT is close to, preferably equal to, the value DT0 for which integral Q0 is minimum, enables to increase the power efficiency of the switching cell, and/or to simplify the operation of the switching cell for duty cycles close to 0 or to 1, and/or to limit a harmonics level.

In practice, the times taken by the switches to switch from the on state to the off state, as well as the characteristics of switches T1 and T2 comprising diodes D1 and D2, such as their capacitances, depend on operating parameters such as, for example, voltage V across the switching cell, the current I supplied by the switching cell, and the operating temperature. Value DT0 then varies according to the operating parameters.

The fact of setting the dead time during the operation enables to vary the value of the dead time when the operating parameters change, to improve the power efficiency and decrease the harmonics level for all operating parameters. In particular, in a converter receiving or delivering an AC voltage, it may be provided that, during the setting, the setting time, defined between the beginning of the setting and the obtaining of a dead time value close to value DT0, is shorter than the time taken by the AC voltage to significantly vary during a halfwave. As compared with a longer setting duration, this provides an additional increase of the power efficiency, and/or an additional simplification for duty cycles close to 0 and to 1, and/or an additional limitation of the harmonics level.

Preferably, the integration duration starts at time t1 when the current I2 in switch T2 takes a zero value. In other words, the integration duration starts at a time when the value supplied by current sensor 114 (FIG. 3) is representative of a zero value of the current flowing through switch T2. AS a variant, the integration duration starts before or after time t1, for example, when the value of current I2 crosses a threshold. However, as compared with this variant, integral Q0 starting at time t1 enables to further improve the power efficiency and/or to further limit the harmonics level.

Preferably, the integration duration is equal to a duration between successive zero crossings of the current flowing through switch T2. In other words, when the integration starts at a time t1, the integration period ends at time t3. This enables to avoid taking into account the charge flowing through switch T2 during oscillations. As compared with a variant where the integration duration is greater than the duration between times t1 and t3, that is, between the successive zero crossings of the current flowing through switch T2, this enables to further improve the power efficiency and/or to further limit the harmonics level.

Although, in the examples of FIGS. 5 to 7, diode D2 has a PN junction, diode D2 may be replaced with any other type of diode, for example, a Schottky diode. It will then be within the abilities of those skilled in the art, based on the explanations of FIGS. 5 to 7, to determine the characteristics of the switches, and in particular a stray capacitance of the switch when diode D2 is forward-biased, for which integral Q0 exhibits a minimum value.

Although, in the embodiments described hereabove in relation with FIGS. 4 to 7, the dead time is set so that its value DT is close to value DT0, this is not limiting. In particular, in a variant, dead time value DT is adjusted so that the slope of integral Q0 according to the dead time has a predefined value. Preferably, the predefined value corresponds to a negative slope, that is, a decrease of integral Q0 when the dead time increases. In this variant, integral Q0 may then not exhibit a minimum value. In this variant, when integral Q0 exhibits a minimum, a dead time value smaller than value DT0 may be obtained. As compared with a dead time value close to value DT0, this enables to further increase the variation range of the duty cycle, and thus to further simplify the converter for duty cycles close to 0 to 1 and/or to further limit the harmonics level.

Further, although, in the embodiments described hereabove in relation with FIGS. 4 to 7, the dead time is set according to a value representative of integral Q0, this is not limiting. As a variant, an improvement of the power efficiency and/or a simplification of the operation for duty cycles close to 0 or to 1, and/or a limitation of the harmonics level by other ways of setting the dead time according to the measurement of the current flowing through switch T2 controlled to the off state, may be obtained. For example, the integration may be replaced with any step enabling to determine according to value DT a value enabling to distinguish from one another other the shapes, such as shown in FIGS. 5 to 7, of the current according to time when switch T2 is off and, preferably, when switch T1 is on.

Figure 8:
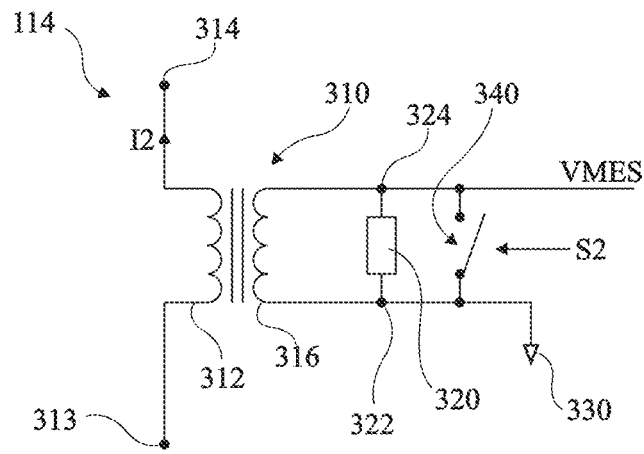
FIG. 8 schematically shows an embodiment of a current sensor of the control device of FIG. 3.

FIG. 8 schematically shows an embodiment of the current sensor 114 of the control device of FIG. 3.

Current sensor 114 here comprises a magnetic-type sensor. Preferably, the magnetic-type sensor comprises, more preferably is formed by, a transformer 310. Transformer 310 comprises a winding 312. Winding 312 is coupled, preferably connected, in series with switch T2 (FIG. 3). For this purpose, winding 312 has a terminal 313 coupled, preferably connected, to terminal 102 (FIG. 3) or to node 106 (FIG. 3) of the switching cell, and another terminal 314 coupled, preferably connected, to a conduction terminal of switch T2.

Transformer 310 further comprises a winding 316. Preferably, sensor 114 comprises a resistor 320 coupling together the terminals of winding 316. Resistor 320 delivers, between its terminals 324 and 322, a voltage value VMES representative of the current I2 flowing through switch T2. Terminals 322 and 324 forms output terminals of the sensor. Voltage value VMES is for example referenced to a reference potential such as that of a ground 330. Ground 330 is then coupled, preferably connected, to terminal 322 of resistor 320.

As a variant, transformer 310 may be replaced with another type of current sensor, for example, of resistive (shunt) type, of Rogowski type, or of Hall effect probe type. However, as compared with this variant, the transformer is easier to implement and/or has a faster response. A faster response enables to obtain a more accurate setting of the dead time.

Preferably, a switch 340 couples the output terminals 322 and 324 of the sensor. In an example, switch 340 is controlled by the control signal S2 of switch T2. Thus, switch 340 shorts secondary winding 316 when switch T2 is controlled to the on state. In variant, switch 340 is omitted, and the current measurement is performed continuously. As compared with such a variant, switch 340 enables to avoid saturating transformer 310. According to an advantage, the measurement is only triggered by the control of switch T2 having its current measured. According to another advantage, switch 340 has time, in particular during the dead time, to become fully conductive before the beginning of the period when the current measurement is used to set the dead time.

In another example, switch 340 is controlled by the inverse of signal S1 of switch T1. As compared with a control by signal S2, this other example enables to further decrease the risk of saturation of the transformer.

Figure 9:
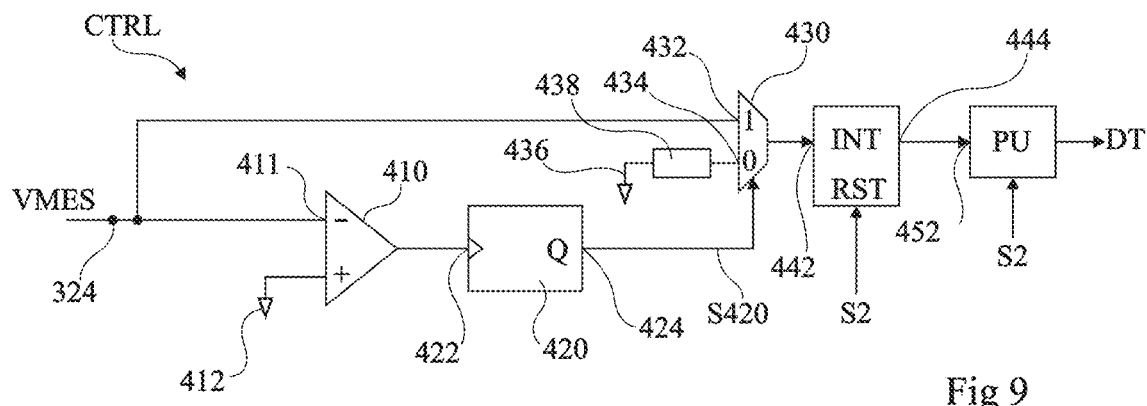
FIG. 9 schematically shows an embodiment of a circuit of the switching cell of FIG. 3.

FIG. 9 schematically shows an embodiment of the circuit CTRL of the control device 110 of FIG. 3.

Circuit CTRL comprises a comparator circuit 410. Comparator circuit 410 has an input 411, for example, an inverting input (−) coupled, for example connected, to the output 324 of sensor 114 (FIG. 8), delivering value VMES. In other words, control device 110 comprises a link, for example, a connection, between output 324 and input 411. The link may be direct (that is, output 324 and input 411 are connected to each other) or via one or a plurality of other elements. This other element may be a switch or, as described hereafter in relation with FIG. 12, a multiplexer. Another input, for example, a non-inverting input (+), of comparator circuit 410 is coupled, preferably connected, to a node 412 of application of a fixed potential, for example, a node defined by the ground. As a variant, comparator circuit 410 is configured to compare value VMES with the value of a potential different from that of ground. Preferably, the value of the potential of node 412 is representative of a null current in sensor 114. Comparator circuit 410 may comprise, preferably be formed by, a comparator or any other circuit configured to perform a comparison, such as, for example, a comparator-assembled operational amplifier.

Circuit CTRL further comprises a monostable circuit 420. Monostable circuit 420 has a trigger input 422 coupled, preferably connected, to an output of comparator circuit 410. Monostable circuit 420 delivers, on an output 424 (Q), a signal S420. Signal S420 is used as described hereafter to define a period during which the current measurement is used to set the dead time, for example, the period during which the measured value is integrated to obtain a value representative of integral Q0. As a variant, for the integration to start at a time t1 (FIGS. 5 to 7) and to end at time t3 (FIGS. 5 to 7), a specific circuit configured to determine a time when comparator circuit 410 generates a falling edge may be provided and the integration may be stopped at this time.

Circuit CTRL further comprises a multiplexer 430 controlled by signal S420. Multiplexer 430 has an input 432 (1) coupled, preferably connected, to output 324 of sensor 114 (FIG. 8). The multiplexer has another input 434 (0), for example, coupled by a resistor 438 to a node 436 of application of a fixed potential, for example, the ground. Resistor 438 preferably has a high value, that is, greater than 100 kOhms. Input 434 may be floating, that is, non coupled.

Circuit CTRL further comprises an integrator circuit INT. Integrator circuit INT has an input 442 coupled, preferably connected, to an output of multiplexer 430. Integrator circuit INT comprises a reset input RST receiving the control signal S2 of switch T2. In operation, integrator circuit INT determines a value representative of the integral of a signal applied to its input 442. Such a representative value is supplied on an output 444 of integrator circuit INT. Such a value representative of the integral is set to zero when signal S2 is at its high level. As a variant, multiplexer 430 is replaced with a controlled switch coupling nodes 432 and 442 together.

Integrator circuit INT is preferably selected so that the value of the integral determined by integrator circuit INT remains unchanged when signal S420 selects input 434 of multiplexer 430. The expression selected input of a multiplexer designates, among the multiplexer inputs, that having its potential applied by the multiplexer to the output of the multiplexer, for example, that which is connected by the multiplexer to the multiplexer output. As an example, for an integrator circuit such as that described hereafter in relation with FIG. 15, the fact for resistor 438 to have a high value or for input 434 to be floating enables the value of the integral determined by integrator circuit INT to remain unchanged, at the time scale of the performed measurement, when signal S420 selects input 434 of multiplexer 430. As a variant, the potential applied to input 434 may take any value enabling, when this value is applied to the input of an integrator circuit, to leave the integral value determined by the integrator circuit unchanged.

Circuit CTRL further comprises a processing circuit PU. Processing circuit PU has an input 452 coupled, preferably connected, to the output 444 of integrator circuit INT. Processing circuit PU for example receives the control signal S2 of switch T2. The processing circuit is for example configured so that its operation is synchronized by signal S2. Processing circuit PU is configured to implement a setting algorithm, preferably a minimization algorithm. For this purpose, as an example, processing circuit PU comprises an analog value storage unit and/or flip-flops and/or a memory, and an analog processing unit, for example, formed of analog circuits comprising comparators and logic gates. Processing circuit PU may also comprise an analog-to-digital converter coupled to the output 444 of the integrator circuit, and a sequential digital data processing unit such as a microprocessor or a field-programmable gate array FPGA. Processing circuit PU may be formed by any usual circuit capable of implementing a usual minimization algorithm.

Figure 10:
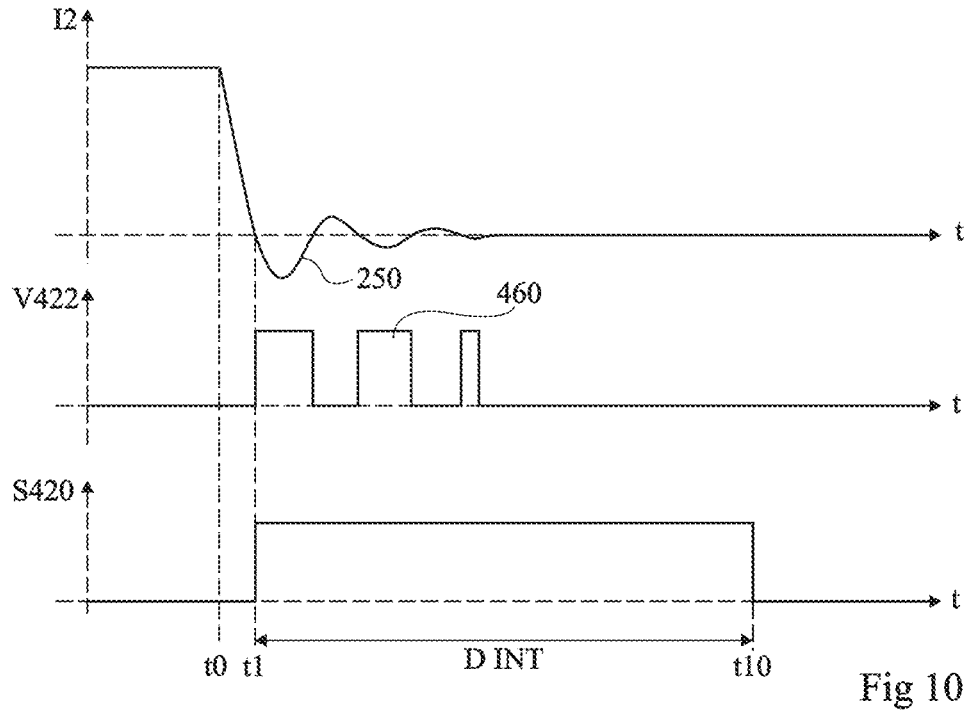
FIG. 10 shows, in the form of simplified timing diagrams, the shape of a current and of signals of the circuit of FIG. 9.

FIG. 10 shows, in the form of simplified timing diagrams, the shape of current I2 and of signals of the circuit of FIG. 9. More particularly, FIG. 10 illustrates the operation of the comparator circuit 410 and of the monostable circuit 420 described in relation with FIG. 9, when the current I2 in switch T2 has one of the shapes described in relation with FIGS. 5 to 7.

Comparator circuit 410 delivers a signal V422. Signal V422 is at a low logic level when value VMES is greater than the value of the fixed potential of node 412 (FIG. 9), this value being preferably null. Signal V422 may also be at a low logic level when value VMES is null to within the uncertainties of the measurement. Thus, for the selected current sensor 114, comparator circuit 410 delivers the low logic level when current I2 in switch T2 is positive, that is, of same direction as when switch T1 is off. Comparator circuit 410 supplies a high logic level when value VMES is smaller than that of the fixed potential of node 412. In particular, the output of the comparator circuit switches to the high logic level at time t1 when current I2 takes a zero value. For example, comparator circuit 410 then delivers a square pulse 460 at each oscillation 250 (FIGS. 5 to 7) of current I2.

Monostable circuit 420 is triggered when comparator circuit 410 generates a rising edge between its low and high logic output levels. The output signal S420 of monostable circuit 420 is at a low level before triggering. A triggering thus occurs at time t1. After the triggering, signal S420 remains at a high level for a time DINT, predefined, until a time t10. For example, the monostable circuit is one-shot, that is, non retriggerable, and time DINT is thus independent from the number of square pulses 460 and from their durations.

Figure 11:
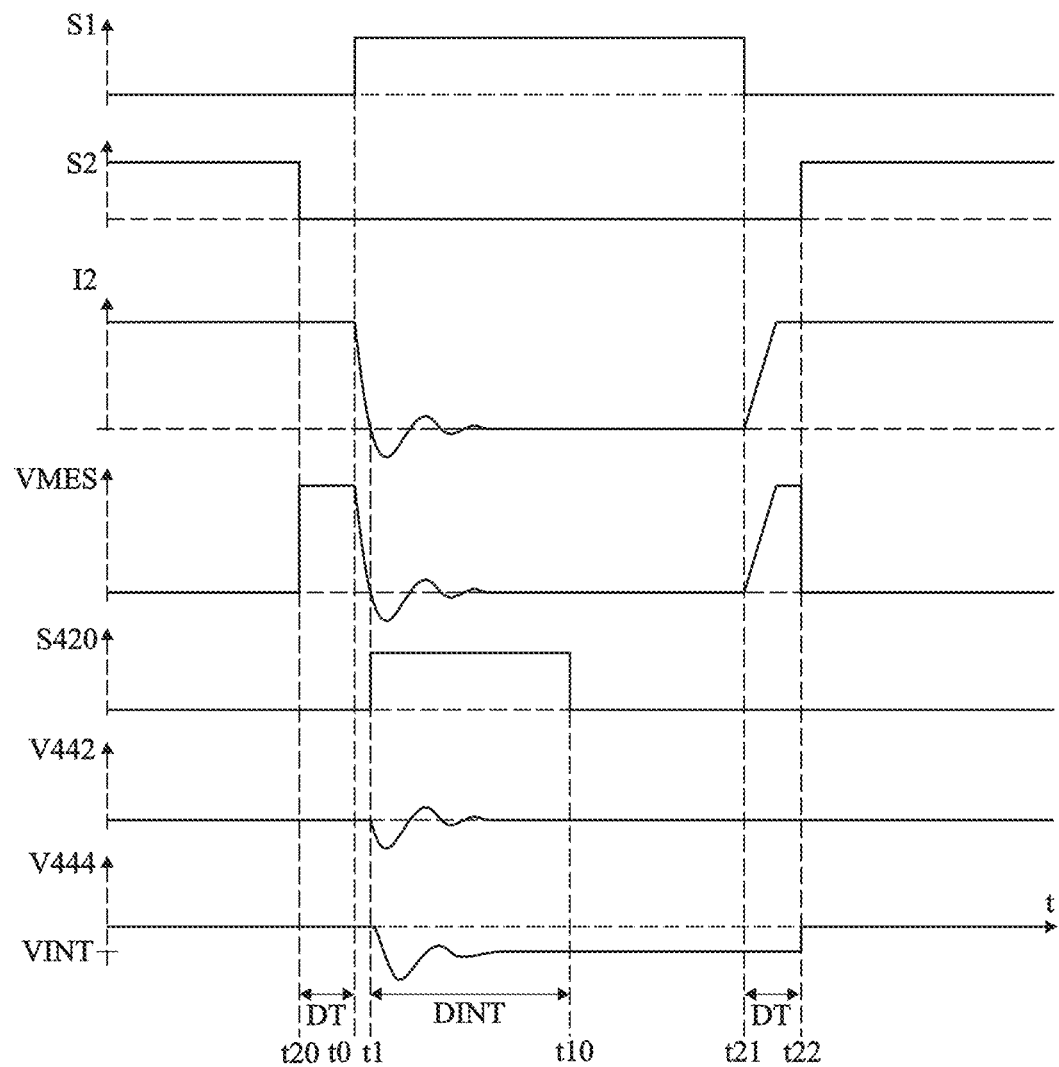
FIG. 11 shows, in the form of simplified diagrams, an example of operation of the switching cell of FIG. 3 comprising the circuits of FIGS. 8 and 9.

FIG. 11 shows, in the form of simplified timing diagrams, an example of operation of the switching cell of FIG. 3. More particularly, FIG. 11 shows the shape according to time t of control signals S1 and S2, of current I2, of potential VMES, of signal S420, and of potential values V442 and V444, in the case where control device 110 comprises the circuits of FIGS. 8 and 9. Value V442 is that which is received by integrator circuit INT on its input 442. Value V444 is that which is delivered by integrator circuit INT on its output 444. The timing diagrams show a switching cycle of the switching cell.

At the beginning of the shown cycle, signal S2 for controlling switch T2 is at its high level, control signal S1 is at its high level, and current I2 is equal to the current I supplied by the switching cell. Due to the fact that switch 340 (FIG. 8) is on, value VMES is equal to zero. Signal S420 is at a low level, which causes the selection of input 434 of multiplexer 430. Thus, value V442 is a value which does not modify, or does not substantially modify, the integral delivered by the integrator circuit. Value V444 is null due to the fact that the RST input of integrator circuit INT is activated.

At a time t20, signal S2 switches to its low level. Switch T2 is then controlled to the off state. Further, according to an embodiment, current I2 is measured from this time, due to the turning off of switch 340 (FIG. 8). Potential VMES then switches to a value representative of current I2. Signals S1, S2, and S420, and current I2 then have the shapes previously described in relation with FIGS. 5 to 7 and 10, until time t10. Potential VMES then has the same shape as current I2.

Between times t1 and t10, signal S420 is at the high level, which causes the selection of input 432 of multiplexer 430. According to an embodiment, the value V442 received by integrator circuit INT then is value VMES. Thus, value V442 has damped oscillations and becomes null after these oscillations. The value V444 delivered by integrator circuit INT also oscillates and then stabilizes at a value VINT representative of integral Q0. Preferably, time DINT is selected to be sufficiently long for the oscillations to be approximately over, preferably over, at time t10.

At a subsequent time t21, a dead time starts by the switching of signal S1 to its low level. The dead time ends at time t22 by the switching of signal S2 to its high level. In the shown example, the dead time is such that current I2 runs through diode D2 between times t21 and t22. However, after the setting of the dead time, according to the above-described embodiments, current I2 does not have time to run through diode D2.

Value VINT is kept by integrator circuit INT until time t22. Processing circuit PU stores value VINT before time t22. From time t22, the signal S2 received by integrator circuit INT on its input RST causes the resetting of the integral. Value V444 becomes null and a new cycle starts.

Thus, processing circuit PU stores value VINT at each cycle, in synchronized fashion, by signal S2 in the shown example. The synchronization may be performed by any other signal capable of causing the storage of value VINT by processing unit PU at each cycle. As a variant, the stored values are separated by several cycles, which enables to slow down the processing circuit and thus to decrease its cost and/or to simplify it. However, as compared with such a variant, the fact of storing value VINT at each cycle has the advantage of accelerating the setting of the dead time during the operation of the switching cell. The less small the switching cycle is selected with respect to a variation time of the operating parameters of the converter, such as, for example, a cycle time of an AC voltage, the more accelerating the setting of the dead time is advantageous.

Processing circuit PU searches by iterations the dead time value DT corresponding to the minimum of integral Q0. For example, each iteration corresponds to a switching cycle. For this purpose, processing circuit PU stores at least three values VINT1, VINT2, VINT3 representative of integral Q0 obtained, preferably, during three previous switching cycles, for three respective dead time values.

At each iteration, based on the stored values VNT1, VINT2, VINT3, the processing circuit determines whether it should increase or decrease dead time value DT. As an example, internal signals, not shown, DT+ and DT−, for example, binary, are determined by the processing circuit, and are activated if dead time value DT is to be respectively increased or decreased. The processing circuit adjusts value DT according to these signals. As a variant, circuit DRV (FIG. 3) is configured to receive signals DT+ and DT− from processing circuit PU and adjusts value DT according to these signals.

As a variant, any minimization algorithm may be used. Preferably, the algorithm is selected so that the number of iterations to obtain a dead time value DT substantially equal to value DT0 (FIG. 4), starting from an initial dead time value such as defined hereabove in relation with FIG. 3, is smaller than 50, preferably smaller than 10. This enables to keep the optimal operating point during variations of the current and/or of the voltage received/delivered by the switching cell, for example, when voltage V and/or current I are an AC voltage/current. In an example, signals DT+ and DT− are not binary, but take analog values representative of differences VINT1−VINT2 and VINT1−VINT3 between value VINT1 and respective values VINT2 and VINT3. This enables to obtain the minimum faster than with binary signals DT+ and DT−.

Figure 12:
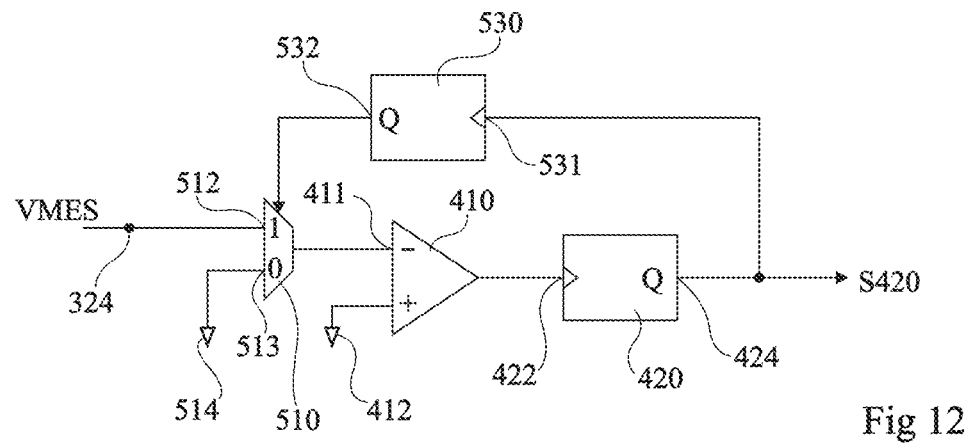
FIG. 12 partially and schematically shows another embodiment of a circuit of the switching cell of FIG. 3.

FIG. 12 partially and schematically shows an embodiment of a circuit of the switching cell of FIG. 3. More particularly, the embodiment shown herein partially corresponds to a variant of a portion of the circuit of FIG. 9.

The link between input 411 of comparator circuit 410 and output 324 of sensor 114 (FIG. 8) comprises a multiplexer 510. In other words, multiplexer 510 couples input 411 to output 324. More particularly, multiplexer 510 has an input 512 (1) coupled to output 324 and an output coupled to input 411 of comparator circuit 410. Multiplexer 510 has an input 513 (0) coupled, preferably, to a node 514 of application of a fixed potential. The fixed potential of node 514 may be greater than, approximately equal to, or equal to, the fixed potential of node 412. Preferably, node 514 is coupled, preferably connected, to ground. Preferably, nodes 412 and 514 are a common node defined by the ground.

A monostable circuit 530 has a trigger input 531 coupled to output 424 of monostable circuit 420. Monostable circuit 530 controls multiplexer 510 with a signal delivered on an output 532 (Q). In operation, the triggering of monostable circuit 420 causes the triggering of monostable circuit 530. The signal delivered by monostable circuit 530 remains at the high level for a duration DMONO (not shown) before returning of the low level. Duration DMONO is greater than duration DINT of the high level of signal S420. When the signal supplied by monostable circuit 530 is at the high level, input 513 of multiplexer 510 is selected, which prevents the comparator from delivering square pulses 460 (FIG. 10). This enables to avoid for a new integration period DINT to start after a possible square pulse 460. This also enables to decrease time period DINT (FIG. 10) so that it is shorter than the time for which current I2 has damped oscillations.

Figure 13:
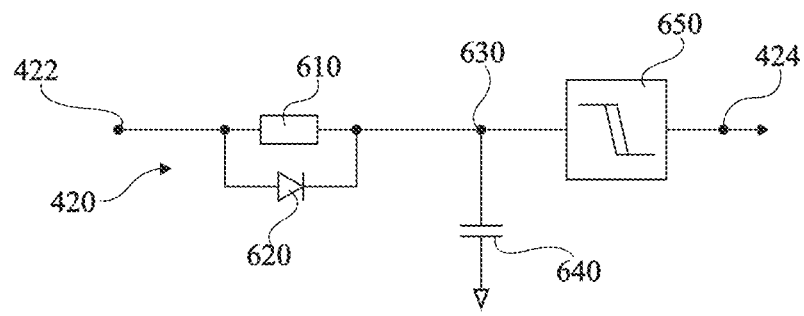
FIG. 13 schematically shows an embodiment of a portion of the circuit of FIG. 9 or of FIG. 12.

FIG. 13 schematically shows an embodiment of the monostable circuit 420 of the circuit CTRL of FIG. 9 or of its variant of FIG. 12.

According to this embodiment, monostable circuit 420 comprises a resistor 610 and a diode 620 electrically in parallel between trigger input 422 and a node 630. Diode 620 has its anode facing input 422. A capacitor 640 couples node 630 to a node of application of a fixed potential, for example, the ground. Monostable circuit 420 further comprises a hysteresis trigger circuit 650 coupling node 630 to output 424 of monostable circuit 420. The values of resistance 610 and of capacitance 640 and the threshold values of circuit 650 are selected to obtain the operation described in relation with FIG. 10.

A specific embodiment of monostable circuit 420 is described hereabove in relation with FIG. 13, however, monostable circuit 420 may be formed by any monostable circuit configured to operate as described in relation with FIG. 10.

Figure 14:
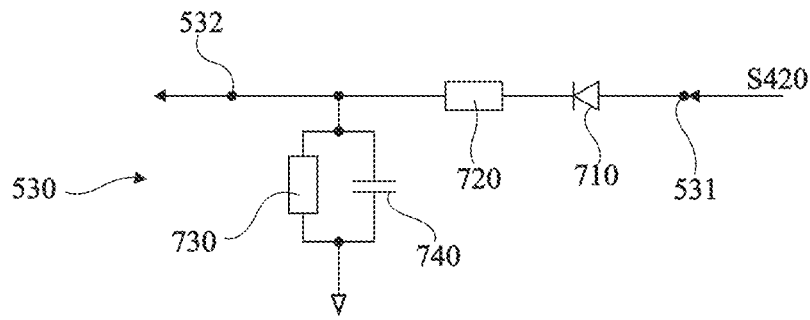
FIG. 14 schematically shows an embodiment of another portion of the circuit of FIG. 12.

FIG. 14 schematically shows an embodiment of the monostable circuit 530 of FIG. 12.

According to this embodiment, monostable circuit 530 comprises a diode 710 and a resistor 720, electrically in series between input 531 and output 532 of monostable circuit 530. The diode has its anode facing input 531 of monostable circuit 530. In the shown example, diode 710 is on the side of input 531 and the resistor is on the side of output 532, the inverse being also possible. The monostable circuit further comprises a resistor 730 and a capacitor 740 electrically in parallel between output node 532 and a node of application of a fixed potential, for example, the ground.

In operation, the setting to the high level of signal S420 causes the charge of capacitor 740 through diode 710 and resistor 720, which causes the selection of input 513 (FIG. 12) of multiplexer 510. The return of signal S420 to the low level marks the beginning of a decrease of the potential of output node 532, capacitor 740 discharging through resistor 730. Input 512 of multiplexer 510 is selected from a time when the potential of output node 532 crosses a node internal to this multiplexer. The values of resistor 730 and of capacitor 740 are selected according to this threshold so that the duration between the switching of signal S420 to the high level and the threshold crossing time is equal to the desired duration DMONO described in relation with FIG. 12.

A specific embodiment of monostable circuit 530 is described hereabove in relation with FIG. 14, however, monostable circuit 530 may be formed by any monostable circuit configured to operate as described in relation with FIG. 12.

Figure 15:
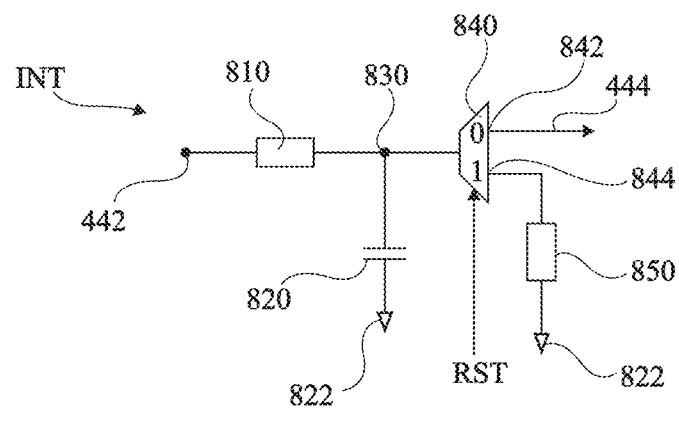
FIG. 15 schematically shows an embodiment of still another portion of the circuit of FIG. 8.

FIG. 15 schematically shows an embodiment of the integrator circuit INT of the circuit of FIG. 9. According to this embodiment, integrator circuit INT is preferably used when input 434 (FIG. 9) of multiplexer 430 (FIG. 9) is floating.

According to this embodiment, integrator circuit INT comprises a resistor 810 and a capacitor 820 in series between input 442 and a node 822 of application of a fixed potential, preferably, the ground. More particularly, a node 830 is coupled to input 442 by resistor 810 and to node 822 by capacitor 820. A multiplexer (demultiplexer), or switch, 840, has a control terminal coupled, preferably connected, to reset input RST. Multiplexer 840 has an input coupled, preferably connected, to node 830. Multiplexer 840 has an output 842 (0) coupled, preferably connected, to output 444 of integrator circuit INT. Multiplexer 840 has an output 844 (1) coupled to node 822 by a resistor 850.

In operation, when the potential applied to input RST is at the low level, multiplexer 840 couples, preferably connects, the output 444 of integrator circuit INT to node 830. Resistor 810 and capacitor 820 then form a low-pass filter delivering on node 830 a filtered value representative of integral Q0. When the potential applied to input RST is at the high level, capacitor 820 is discharged through resistor 850. It will be within the abilities of those skilled in the art to determine, particularly based on the characteristics of the switching cell and on its operating parameters, the values of capacitor 820 and of resistor 810 enabling to obtain a desired voltage level at the input of processing circuit PU.

A specific embodiment of integrator circuit INT is described hereabove in relation with FIG. 15, however, integrator circuit INT may be formed of any circuit configured to deliver a value representative of integral Q0. For example, integrator circuit INT may comprise an operational amplifier assembled as an integrator. According to an embodiment, integrator circuit INT may comprise an analog-to-digital converter and a digital circuit. The digital circuit may comprise a sequential data processing unit, such as a microprocessor, or a field-programmable gate array FPGA. As compared with an integrator with an operational amplifier or a digital circuit, the use of a low-pass filter enables to obtain a value representative of integral Q0 in simplified fashion.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional indications provided hereinabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A switching cell comprising first and second switches series-coupled, the first switch comprising a diode, coupling terminals of the first switch and oriented to conduct a current supplied or received by the switching cell when the first and second switches are simultaneously in the off state, the switching cell comprising a device configured to implement a method comprising measuring a current flowing through the first switch when the first switch is controlled to the off state, and setting a switching dead time according to the measurement,
   wherein the setting comprises determining a first value representative of an integral of a second value resulting from the measurement during an integration period,
   and wherein said setting comprises searching for a third value of the switching dead time for which the first value representative of the integral exhibits an extremum,
   wherein the switching cell comprises a sensor configured to measure the current flowing through the first switch, and wherein said device comprises:
   a comparator circuit and a link between an input of the comparator circuit and said sensor, another input of the comparator circuit being coupled to a first node of application of a fixed potential;
   a monostable circuit having a trigger input coupled to an output of the comparator circuit;
   a multiplexer controlled by the monostable circuit and having an input coupled to said sensor; and
   an integrator circuit having an input coupled to an output of the multiplexer, the integrator circuit preferably comprising a resistor and a capacitor in series between said input of the integrator circuit and the first node or another node of application of a fixed potential.

2. The switching cell according to claim 1, wherein said device is configured to perform the measurement when the second switch is controlled to the on state.

3. The switching cell according to claim 1, wherein a duration of the integration period is predefined and/or in the range from 0.1% to 50% of a switching cycle time, and/or greater than or equal to a duration between two successive zero crossings of the current flowing through the first switch.

4. The switching cell according to claim 1, wherein the integration period starts at a time when said second value resulting from the measurement is representative of a zero value of the current flowing through the first switch.

5. The switching cell according to claim 1, wherein said sensor comprises a magnetic-type sensor.

6. The switching cell according to claim 1, comprising a third switch coupling output terminals of said sensor.

7. The switching cell according to claim 1, wherein:
   said link comprises another multiplexer having an input coupled to said sensor and an output coupled to said input of the comparator circuit, said other multiplexer having another input coupled to the first node or to a second node of application of a fixed potential; and another monostable circuit has a trigger input coupled to the output of said monostable circuit and controls said other multiplexer.

8. A switched-mode converter comprising at least one switching cell according to claim 1.

9. The switching cell according to claim 5, wherein the magnetic-type sensor is a transformer.

10. The switching cell according to claim 6, wherein the third switch is controlled by a same control signal as the first switch.

* * * * *